(12) United States Patent
Jin

(10) Patent No.: US 6,998,819 B2
(45) Date of Patent: Feb. 14, 2006

(54) CURRENT LEAKAGE DETECTION IN HIGH VOLTAGE BATTERY PACK

(75) Inventor: Jizeng Jin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 10/447,042

(22) Filed: May 28, 2003

(65) Prior Publication Data

US 2004/0004481 A1 Jan. 8, 2004

Related U.S. Application Data

(60) Provisional application No. 60/383,749, filed on May 28, 2002.

(51) Int. Cl.
*B60L 3/00* (2006.01)
*G01R 31/02* (2006.01)

(52) U.S. Cl. .................................................... 320/136

(58) Field of Classification Search ................ 324/433, 324/426, 427, 425, 430, 443, 444; 320/120, 320/122, 118, 135, 136, FOR. 147, DIG. 27; 307/54, 60, 63; 439/488; B60L 3/00; G01R 31/02
See application file for complete search history.

(56) References Cited

U.S. PATENT DOCUMENTS 4,207,517 A * 6/1980 Bloxam ...................... 324/556
5,760,587 A * 6/1998 Harvey ....................... 324/434

* cited by examiner

*Primary Examiner*—Christian P. Chace
(74) *Attorney, Agent, or Firm*—Tung & Associates; Carlos Hanze

(57) ABSTRACT

A method of detecting leakage currents in a high voltage battery pack system reduces detection error caused by fluctuations in battery pack voltage during the detection process. The voltages of the individual modules forming the battery pack are separately and simultaneously measured during each measurement of leakage current on the high and low sides of the leakage point. Measurements of individual module voltages are combined with the simultaneous current leakage measurements to calculate leak resistance.

13 Claims, 6 Drawing Sheets

| Leakage point (x) | $V_1(X,t_{low})$ | $R_L(X)$ |
|---|---|---|
| TB- | | |
| 1 | 7.3 | -81248.7 |
| 2 | 7.6 | -59644.7 |
| 3 | 8.6 | -35198 |
| 4 | 7.9 | -12741.1 |
| 5 | 8.0 | 10000 |
| 6 | 7.5 | 31319.8 |
| 7 | 6.9 | 50934.01 |
| 8 | 7.7 | 72822.34 |
| | | |
| TB + | | |

| Leakage point (x) | $V_2(X,t_{high})$ | $R_L(X)$ |
|---|---|---|
| TB- | | |
| 1 | 7.2 | 164808.9 |
| 2 | 8.1 | 124488.9 |
| 3 | 7.9 | 851164.44 |
| 4 | 6.9 | 50817.78 |
| 5 | 8.2 | 10000 |
| 6 | 7.7 | -28328.9 |
| 7 | 6.8 | -62177.8 |
| 8 | 8.0 | -102000 |
| | | |
| TB + | | |

| Leakage point (x) | $V_1(X, t_{low})$ | $R_L(X)$ |
|---|---|---|
| TB- | | |
| 1 | 7.3 | -81248.7 |
| 2 | 7.6 | -59644.7 |
| 3 | 8.6 | -35198 |
| 4 | 7.9 | -12741.1 |
| 5 | 8.0 | 10000 |
| 6 | 7.5 | 31319.8 |
| 7 | 6.9 | 50934.01 |
| 8 | 7.7 | 72822.34 |
| | | |
| TB + | | |

FIG. 3A

| Leakage point (x) | $V_2(X, t_{high})$ | $R_L(X)$ |
|---|---|---|
| TB- | | |
| 1 | 7.2 | 164808.9 |
| 2 | 8.1 | 124488.9 |
| 3 | 7.9 | 851164.44 |
| 4 | 6.9 | 50817.78 |
| 5 | 8.2 | 10000 |
| 6 | 7.7 | -28328.9 |
| 7 | 6.8 | -62177.8 |
| 8 | 8.0 | -102000 |
| | | |
| TB + | | |

FIG. 3B

CURRENT LEAKAGE DETECTION IN HIGH VOLTAGE BATTERY PACK

CROSS-REFERENCES TO RELATED APPLICATIONS

This application claims the benefit of priority from Provisional Application No. 60/383,749 filed May 28, 2002, the full disclosure of which is incorporated herein by reference.

FIELD OF THE INVENTION

This invention generally relates to high voltage direct current (DC) power supply systems, and deals more particularly with detection of leakage currents in on-board battery pack systems used as power sources for electric motor driven vehicles.

BACKGROUND OF THE INVENTION

Electric powered and hybrid powered vehicles are becoming more common as alternatives to vehicles powered solely by internal combustion engines. Hybrid vehicles rely on a combination of energy sources for power, such as the combination of an electric motor and internal combustion engine, or even a fuel cell system. Both electric and hybrid vehicles employ electric drive motors that are powered by an on-board, high voltage DC power supply. This power supply includes a rechargeable battery pack formed of plurality of battery modules connected in a closed series circuit, wherein each of the modules is formed from plurality of individual cells. A voltage detection system is connected with the battery pack to monitor battery voltage, and thus the amount of reserve power present in the battery pack.

The battery pack, for example, can produce 300 volts or more, consequently, for safety and other reasons, it is mounted on the vehicle in a manner that electrically isolates it from both the passenger compartment and from the vehicle's chassis. The ungrounded battery pack is therefore part of an "electrically floating" circuit.

Due to any of a number of possible causes, parts of the battery pack may become electrically coupled with the chassis, creating a low resistance path that allows a leakage current to flow from the battery pack to the chassis. Such leakage currents produce a drain on the battery pack.

Systems have been devised in the past for detecting leakage currents in high voltage power supplies of the type mentioned above. These prior systems employ either an AC detection method or a DC detection method. The AC method involves applying an AC signal to a part of the vehicle's body that is insulated from direct currents by a condenser and a transformer. The DC method measures an electrical leakage resistance as a direct current without the need for a transformer or condenser. The known DC method and its shortcomings can be better understood by referring to FIG. 1 of the accompanying drawings which depicts a leakage detection circuit coupled with a battery pack for powering an electrical traction motor. In FIG. 1, the following conventions apply:

| | |
|---|---|
| $V_p$ | Traction battery pack voltage |
| TB+ | Traction battery pack positive |
| TB− | Traction battery pack negative |
| LP | Leakage point |
| $V_1$ | TB+ to leakage point voltage |
| $V_2$ | Leakage point to TB− voltage |
| $R_L$ | Leakage point to chassis leakage resistance |
| $R_c$ | Σ of measurement circuit resistance except A/D measurement resistor |
| $R_{a2d}$ | A/D measurement resistor |
| R | Σ of $R_c$ and $R_{a2d}$ |

For simplicity of illustration, the battery pack is represented as comprising only two battery modules, respectively designed by the DC voltage sources $V_1$ and $V_2$. The method is performed by conducting two successive measurements in two separate circuits, respectively. The first of these measurements is performed on a circuit positioned on the low side of the leakage point LP, formed by $V_1$, $R_c$, switch SW+, $R_{a2d}$, and $R_L$. The second of the measurements is performed on a circuit positioned on the high side of the leakage point LP, formed by $V_2$, $R_c$, switch SW−, $R_{a2d}$, and $R_L$.

To perform the first set of measurements, SW+ is closed, $I_1$ and $V_p$ are measured. Then, $$V_1 = I_1 \times (R_c + R_{a2d} + R_L) = I_1 \times (R + R_L) \tag{1}$$

Next, switch SW− is closed, and $I_2$ is measured. Then, $$V_2 = I_2 \times (R_c + R_{a2d} + R_L L) = I_2 \times (R + R_L) \tag{2}$$

$$\because V_p = V_1 + V_2 \tag{3}$$

and $$I_1 = \frac{V_{a2d1}}{R_{a2d}}; I_2 = \frac{V_{a2d2}}{R_{a2d}} \tag{4}$$

$$\therefore R_L = \frac{V_p \times R_{a2d}}{V_{a2d1} + V_{a2d2}} - R \tag{5}$$

This prior method is based on the assumption that the any changes in the battery module voltages $V_1$ and $V_2$ are negligible between the points in time that the two sets of leakage detection measurements are taken. As a practical matter, however the voltages $V_1$ and $V_2$ may change during the time between the two measurements, in which case the leakage measurements will be in error. The potential magnitude of this error, and the dependence of the leakage resistance $R_L$ on the battery pack voltage $V_p$, may be better appreciated by performing the following sensitivity analysis using equations (4) and (5):

$$\frac{dR_1}{dV_p} = \frac{R_{a2d}}{V_{a2d1} + V_{a2d2}} = \frac{1}{I_1 + I_2} \tag{6}$$

$I_1$ and $I_2$ are typically designed to meet a standard insulation resistance specification requirement of 500Ω/V (per ISO/DIS 6469-1) in case of SW+ or SW− failing in a short circuit mode. Accordingly, $0 \leq I_1 + I_2 \leq 4$ mA, and $$\therefore \frac{dR_1}{dV_{p\,min}} = 250 \ \Omega/V \tag{7}$$

When the leakage resistance is high, $I_1+I_2$ is low, and $$\frac{dR_L}{dV_p}$$

is high. From the foregoing analysis, it may be appreciated that $R_L$ is very sensitive to the changes in $V_p$. Therefore, it can be seen that when the amount of change in the battery pack voltage $V_p$ is more than a negligible amount during the time the two leakage detection measurements are taken, the calculation of $R_L$ from equation (5) is not accurate.

Accordingly, there is a clear need in the art for a method of detecting leakage currents using DC measurement techniques that provides accurate leakage current measurements in spite of fluctuations in battery voltage. The present invention is directed toward satisfying this need.

SUMMARY OF THE INVENTION

A method is provided for detecting a current leakage path in a high voltage, rechargeable battery pack having a plurality of serially connected battery modules. First and second sets of the modules are respectively switched, in succession, into first and second circuits containing a voltage measurement resistor. While switched into these circuits, the voltages produced by the first and second sets of modules are determined, along with the currents flowing through the respective circuits, and the voltages appearing across the current measuring resistor. The leakage resistance of each of the connections to the battery modules is calculated using the determined values of the module voltages, current flows and voltages across the current measuring resistor.

The method uses either of two techniques for eliminating error in the calculated leakage resistance resulting from any changes that occur in the module voltages while the measurement process is being carried out. In one technique, module voltage variation is taken into consideration by simultaneously measuring the individual voltages of all of the modules while determining the measuring circuit current flow and the voltage across the current measuring resistor. In another technique, potential variations in battery pack voltage occurring during the measurement process are taken into consideration through the use of a constant used in the calculations employed to determine the leakage resistance.

A significant advantage of the invention lies the ability to detect current leakage paths in a high voltage rechargeable battery pack that provides accurate results even though the voltages of individual modules forming the battery pack vary during the measurement process used for detecting the leakage.

Another advantage of the invention is that a method is provided for detecting current leakage that reduces error in measuring the leakage resistance of connections to individual modules of the battery pack.

A further advantage of the invention is that current leakage paths oan be detected in multi-module, high voltage battery packs without the need for monitoring changes in the voltages of the individual modules occurring during the process used to determine leakage path resistance.

Other features and advantages of the invention may be better understood by considering the following details of a description of the preferred embodiment of the invention.

In the course of this description, reference will be frequently made to the attached drawings.

BRIEF DESCRIPTION OF THE DRAWINGS

FIG. 3a and FIG. 3b are leakage detection look up tables used in the method of the present invention;

DETAILED DESCRIPTION OF THE PREFERRED EMBODIMENT

Figure 2:
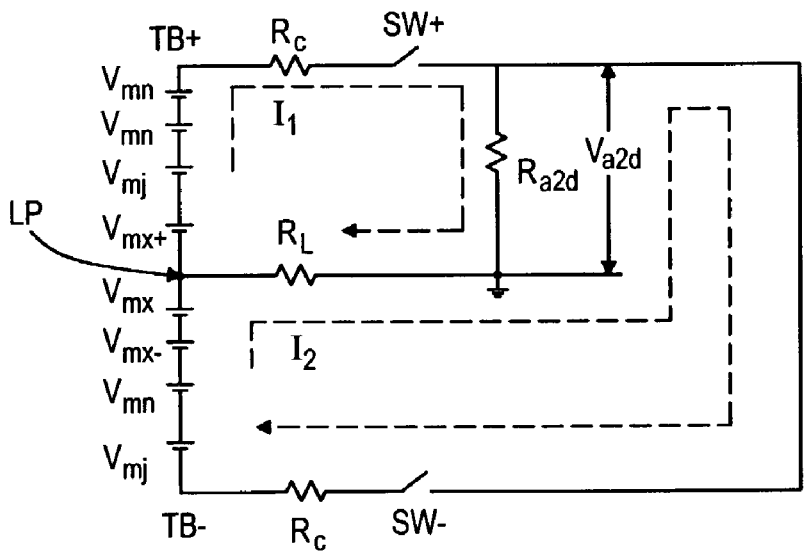
FIG. 2 is a view similar to FIG. 1, but showing additional elements of the circuit useful in understanding the leakage detection method according to the preferred embodiment of the present invention.

Referring to FIG. 2, leakage detection according to the present invention eliminates error in leakage measurements due to fluctuations in battery module voltages by measuring all of the module voltages simultaneously while performing leakage measurements. In practicing the inventive method, it is assumed that the leakage resistance $R_L$ is a constant and that the leakage point LP remains unchanged during the measurement process used to detect the leakage. In FIG. 2, $V_{m1} \ldots V_{mn}$ respectively represent a plurality of individual battery modules connected in series and collectively producing a combined battery pack voltage $V_p$.

For simplicity of illustration, only one connection, LP, is shown between modules $V_{mx}$ and $V_{mx+1}$ for measuring leakage current at this point, however, it is to be understood that the detection apparatus used to carry out the present method will include a plurality of such connections respectively between each of the battery modules at measurement nodes (x), so that leak detection can be performed at each of the modules and the voltage across each module can be measured. Such detection apparatus is known in the art, and typically will include a pair of switches SW+ and SW− which may be opto-relays, and an A-to-D converter (not shown) whose resistance is designated as $R_{a2d}$. The analog parameters that are converted to digital data by the A-to-D converter are processed by circuitry (not shown) which also controls the operation of the switches SW+ and SW− and carries out other control and display functions, typically under software control, such as performing calculations and displaying the detected leakage resistance.

To perform leakage detection, first, switch SW+ is closed, and a measurement is taken of both current $I_1$ and each of the module voltages $V_{m1}(t_{low})$ to $V_{mn}(t_{low})$, simultaneously. Then, switch SW− is closed, and a measurement is taken of both current $I_2$ and each of the module voltages $V_{m1}(t_{high})$ to $V_{mn}(t_{high})$ simultaneously.

From FIG. 2, it may be appreciated that the battery voltages on the high and low sides of the leakage point LP, respectively comprise the sums of the voltages of the individual battery modules on each side of leakage point LP, i.e., $$V_1(t_{low}) = \sum_{i=x}^{n} V_{mi}(t_{low}), \text{ and } V_2(t_{low}) = \sum_{i=1}^{x} V_{mi}(t_{low}) \tag{8}$$

$$V_1(t_{high}) = \sum_{i=x}^{n} V_{mi}(t_{high}), \text{ and } V_2(t_{high}) = \sum_{i=1}^{x} V_{mi}(t_{high}) \tag{9}$$

where: $V_{mi}(t_{low})$ is the battery module voltage when leakage detection on the low side of LP is performed, and $V_{mi}(t_{high})$ is the battery module voltage when leakage detection on the high side of LP is performed.

It follows then, that:

$$V_1(t_{low}) = \sum_{i=x}^{n} V_{mi}(t_{low}) = I_1 \times (R_c + R_{a2d} + R_L) = I_1 \times (R + R_L) \tag{10}$$

$$V_2(t_{high}) = \sum_{i=x}^{x} V_{mi}(t_{high}) = I_2 \times (R_c + R_{a2d} + R_L) = I_2 \times (R + R_L) \tag{11}$$

Based on the foregoing measurements, all module voltages are known on both the low and high sides of the leakage point LP. Using this set of measured module voltage information, and equations (10) and (11), a pair of lookup tables as shown in FIGS. 3a and 3b may be created. Assuming that throughout the measurement process, the leakage point remains unchanged and the leakage resistance remains a constant, there may be only one (x)–$R_L$(x) pair match in the two lookup tables of FIGS. 3a and 3b. In other words, the leakage resistance $R_L$ values that are calculated based on the measurements taken on the low and high sides of the leakage point will be nearly or essentially the same for only one pair of $V_1(x,t_{low})$ and $V_2(x,t_{high})$.

FIG. 3a shows a set of $V_1(x,t_{low})$ and $R_L(x)$ values for each connection or leakage point (x). Similarly, FIG. 3b shows a set of $V_2(x,t_{high})$ and $R_L(x)$ values for each connection or leakage point (x). The numerical values found in the tables of FIGS. 3a and 3b are merely illustrative, but are based on one constructed example, wherein the detection circuit possessed the following characteristics:

$R_c$=100000
$R_{a2d}$=2000
$R_L$=10000
$V_{a2d1}$=0.703571
$I_1$=0.000352
$V_{a2d2}$=−0.40179
$I_2$=0.000201

In the case of this illustrated example, leakage point (voltage node) 5 is the only case where $R_L$ has the same value for the two sets of measurements respectively taken at two different times.

Figure 6:
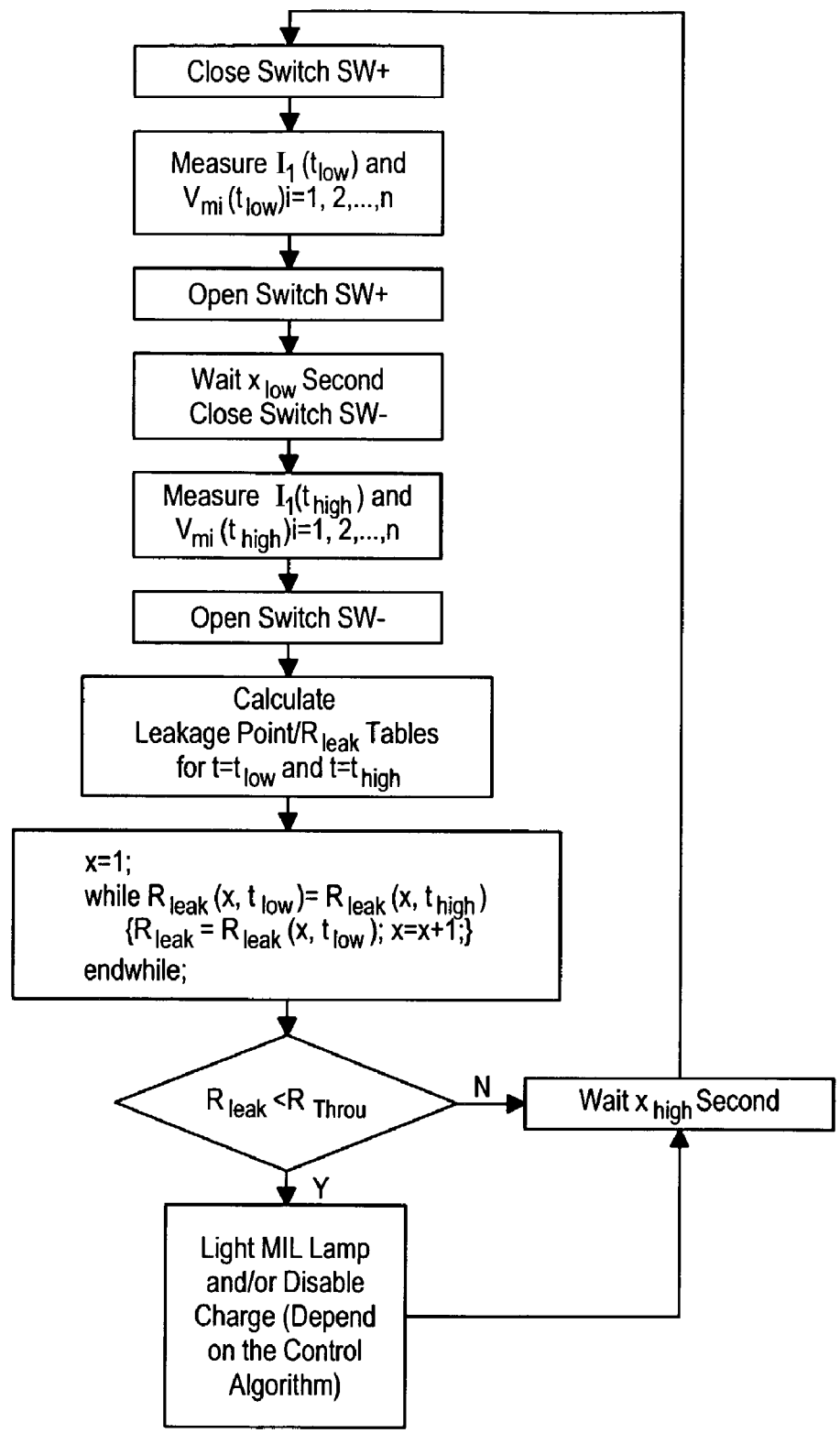
FIG. 6 is a flow chart showing the steps of a leakage detection method according to one embodiment of the invention; and, FIG. 7 is a flow chart showing the steps of a leakage detection method according to an alternate, preferred embodiment of the present invention.

The successive steps of the inventive leak detection method described above are summarized in the flow chart shown in FIG. 6.

An alternate form of the inventive method may be employed if desired, which obviates the need for using the lookup tables described above. This alternate method also recognizes that errors in the measured leakage current can be avoided by taking into consideration variations of the battery pack voltage during the leakage current measurement process. The alternate detection method assumes that each battery module voltage $V_1$, $V_2$ changes in proportion to battery pack voltage $V_p$. Accordingly, when leakage detection on the low side of the leakage point LP is performed:

$$V_1(t_{low})=k \times V_p(t_{low}), V_2(t_{low})=(1-k) \times V_p(t_{low}) \tag{12}$$

and when leakage detection on the high side of the leakage point LP is performed:

$$V_1(t_{high})=k \times V_p(t_{high}), V_2(t_{high})=(1-k) \times V_p(t_{high}) \tag{13}$$

The value "k" is equal to or greater than 0 and is equal to or less than 1, i.e. $0 \leq k \leq 1$. The value "k" can therefore be calculated for example, as follows:

$$k=V_1(t_{low})/V_p(t_{low})=V_1(t_{high})/V_p(t_{high}) \tag{14}$$

Figure 1:
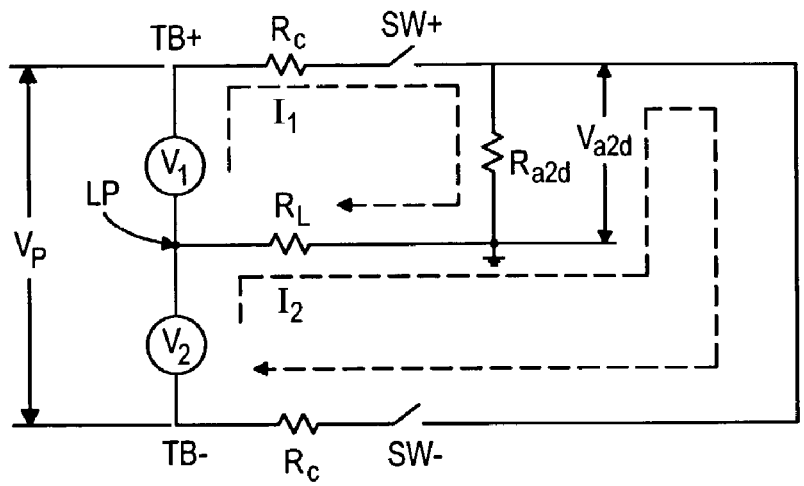
FIG. 1 is a schematic diagram of a circuit for detecting leakage in multi-module battery pack according to a prior art method.

With these relationships known, referring now to FIG. 1, the alternate method is performed by first closing switch SW+ and measuring $I_1$ and $V_p(t_{low})$ simultaneously. $V_1(t_{low})$ can be determined as follows:

$$V_1(t_{low})=k \times V_p(t_{low})=I_1 \times (R_c+R_{a2d}+R_L)=I_1 \times (R+R_L) \tag{15}$$

Next, leakage detection is performed on the high side of the leakage point LP by closing switch SW−, and measuring $I_2$ and $V_p(t_{high})$ simultaneously. $V_2(t_{high})$ can be determined as follows:

$$V_2(t_{high})=(1-k) \times V_p(t_{high})=I_2 \times (R_c+R_{a2d}+R_L)=I_2 \times (R+R_L) \tag{16}$$

$$\therefore \frac{k \times V_p(t_{low})}{(1-k) \times V_p(t_{high})} = \frac{I_1}{I_2} \text{ and,} \tag{17}$$

$$I_1 = \frac{V_{a2d}(t_{low})}{R_{2ad}}; I_2 = \frac{V_{a2d}(t_{high})}{R_{2ad}} \tag{18}$$

$$\therefore k = \frac{1}{\frac{V_{a2d}(t_{high}) \times V_p(t_{low})}{V_{a2d}(t_{low}) \times V_p(t_{high})} + 1} \tag{19}$$

$$\therefore R_L = \frac{R_{a2d}}{\frac{V_{a2d}(t_{high})}{V_p(t_{high})} + \frac{V_{a2d}(t_{low})}{V_p(t_{low})}} - R \tag{20}$$

Figure 7:
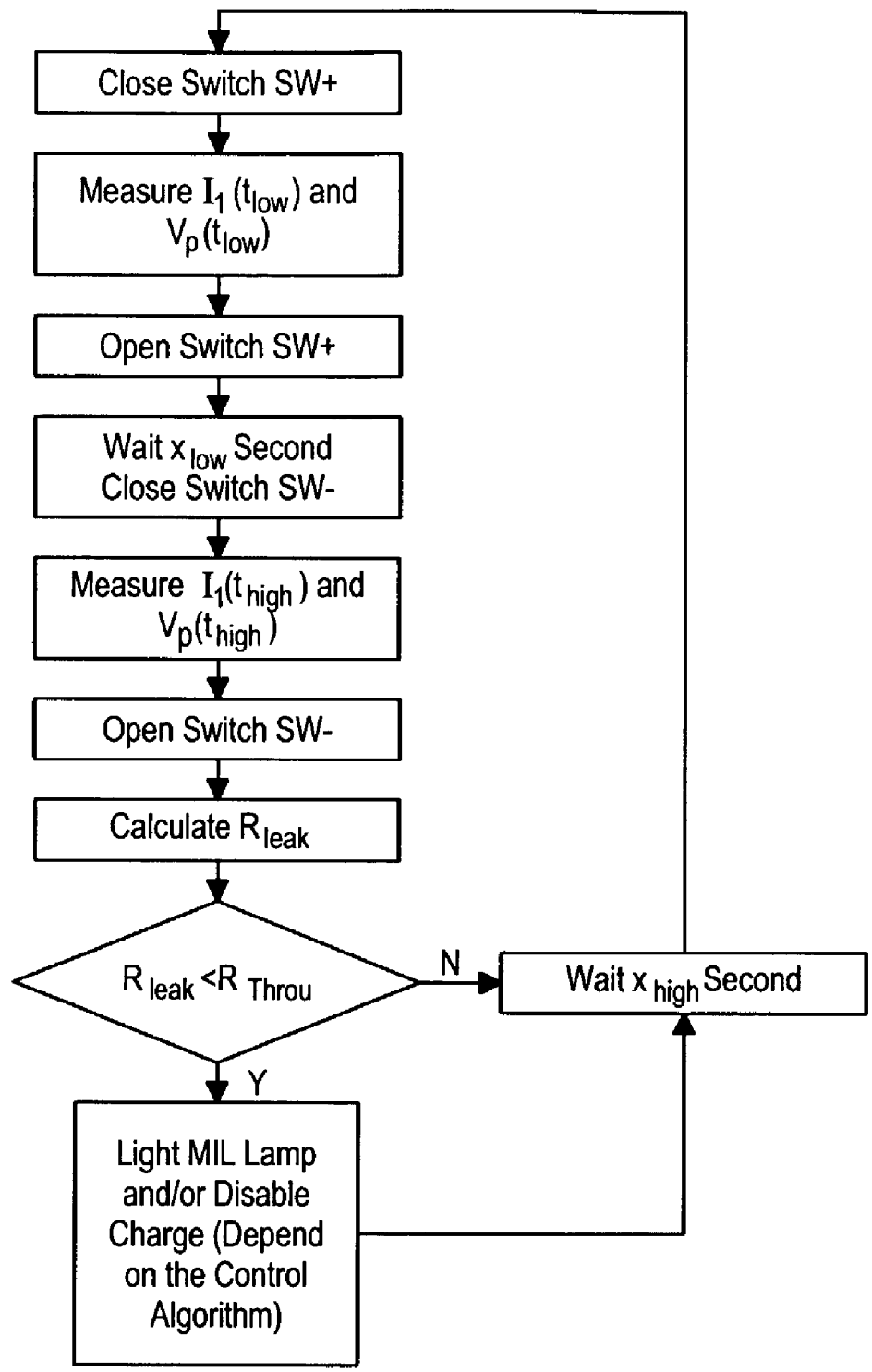

The successive steps of the method forming the preferred embodiment described above are summarized in the flow chart shown in FIG. 7.

Figure 4:
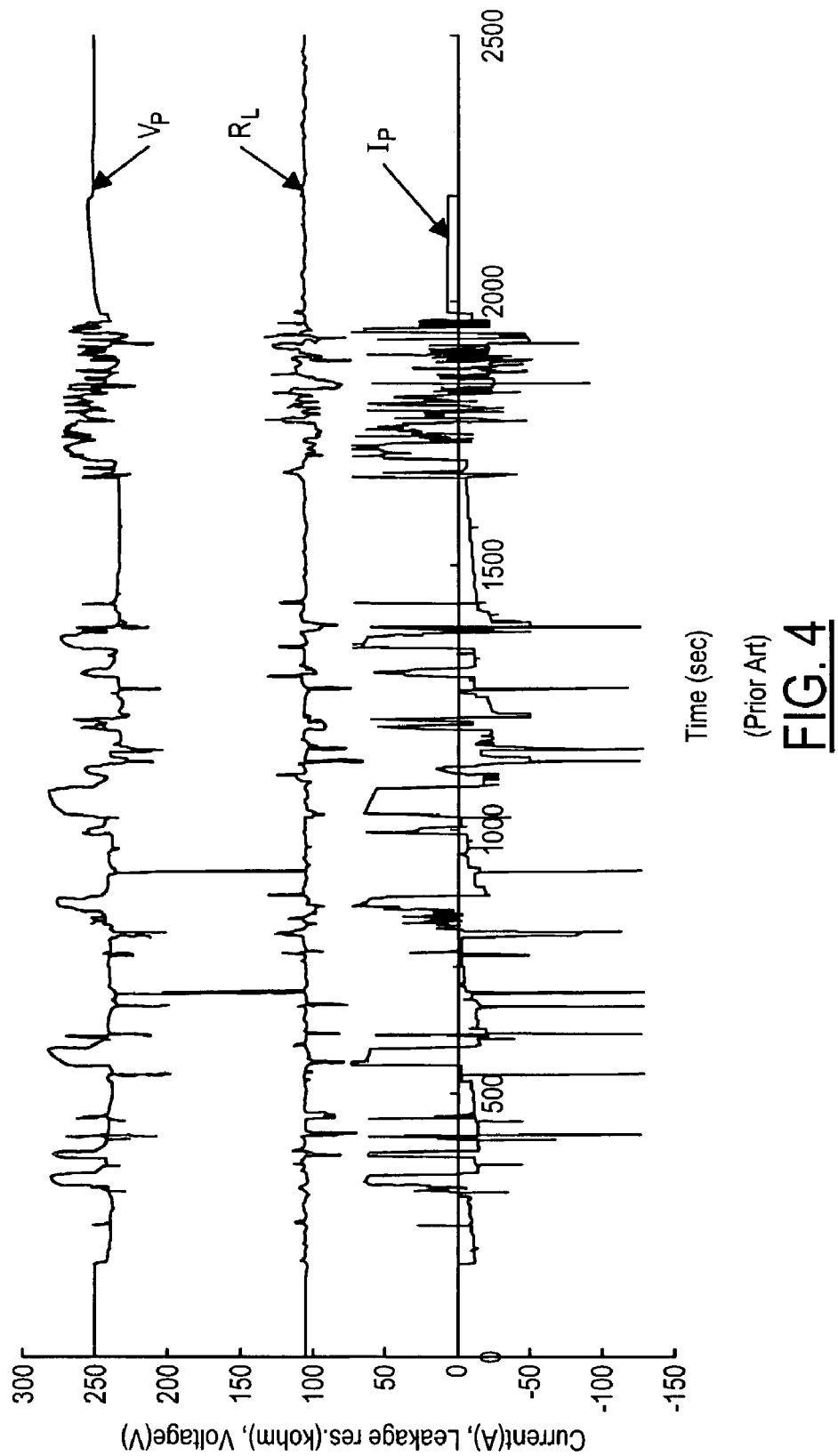
FIG. 4 is a set of waveform plots of the voltage, current and leakage resistance measured in accordance with the prior art method of leakage current detection.
Figure 5:
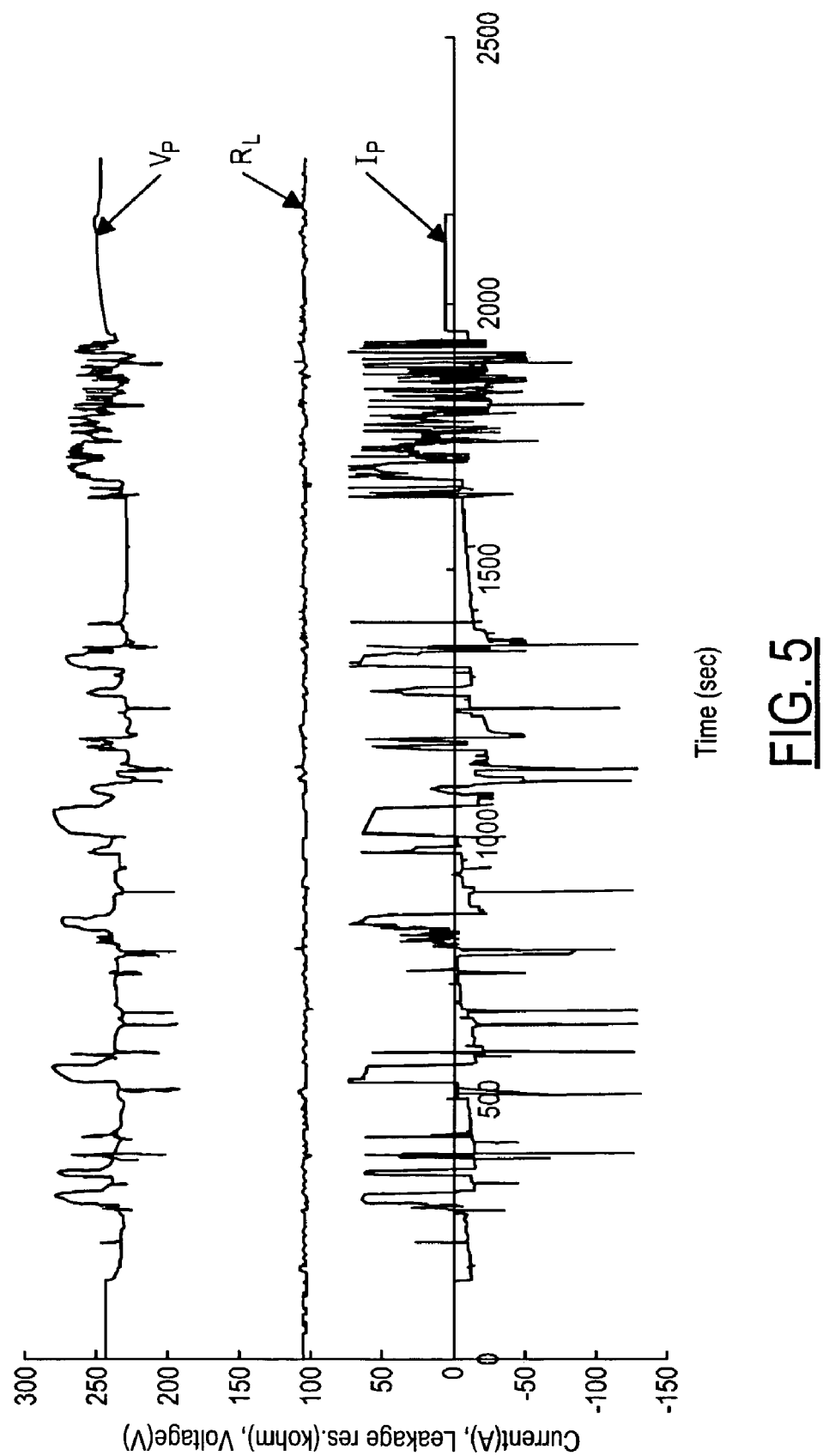
FIG. 5 is a view similar to FIG. 4, but showing the voltage, current and leakage resistance measured in accordance with the inventive method of leakage current detection.

FIGS. 4 and 5 are plots of measured circuit parameters and reveal the benefits of using the method of the present invention compared to the method of the prior art. In each of FIGS. 4 and 5, the lower plot is the current flow $I_p$ through the battery pack, measured in amperes, the middle plot is the leakage resistance $R_L$ measured in kilo-ohms, and the upper plot is the battery pack voltage $V_p$ measured in volts. The horizontal scale is time in seconds. From the comparative waveforms of FIGS. 4 and 5, it can be readily seen that when using the prior art method of determining leakage path resistance, there is a wide variance in $R_L$, as a function of time. This variation is caused by changes in the battery pack voltage between the points in time when the leakage current measurements are taken. In contrast to the variations in $R_L$ FIG. 4, the measured $R_L$ shown in FIG. 5 remains constant over time, regardless of changes in the battery pack voltage.

The current leakage detection method described above may be implemented using various circuits and control systems that are known in the art. The exact system configuration will depend of the particular application, however, one implementation could be in the form of a circuit monitoring system forming part of the control system that controls the functions of the battery pack. Such a system would act to constantly or periodically monitor the "state-of-health" of the battery pack, and take certain actions if a problem is detected. For example, if the monitoring system detects current leakage in a particular battery module that exceeds a first predetermined, threshold value, a simple warning light may be activated to alert the operator that a problem exists requiring attention. Further, the system could also sense a second, higher threshold value of leakage current representing a more serious problem, and take alternate action, such as partially disabling parts of the system powered by the battery pack in order to conserve battery reserve power.

From the foregoing, it may be appreciated that the high voltage leakage detection method described above not only provides for the reliable accomplishment of the objects of the invention, but does so in a particularly effective and simple manner. It is recognized, of course, that those skilled in the art may make various modifications or additions to the embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

The invention claimed is:

1. A method of detecting a current leakage path in a high voltage battery pack having a plurality of serially connected battery modules, comprising:
   (A) connecting a first set of said modules into a first circuit containing a voltage measurement resistor;
   (B) connecting a second set of said modules into a second circuit containing said measurement resistor;
   (C) while said first set of modules is connected in said first circuit, simultaneously determining the voltage of each of the modules, and a first current flowing through said first circuit, and measuring a first voltage across said measurement resistor;
   (D) while said second set of modules is connected in said second circuit, simultaneously determining the voltage of each of the modules, and a second current flowing through said second circuit, and measuring a second voltage across said measurement resistor; and,
   (E) determining a leakage path resistance associated with said leakage path using the first and second currents, the determined voltages of the second set of modules, and the first and second measured voltages, wherein step (E) includes preparing a pair of lookup tables providing comparative data including the leakage resistance at each of a plurality of connection points to said modules representing potential current leakage paths.

2. The method of claim 1, wherein steps (C) and (D) are respectively performed at first and second points in time.

3. The method of claim 1, wherein step (E) includes determining the connection point at which the leakage resistance is the same value in each of the tables.

4. The method of claim 1, wherein:
   one of said lookup tables includes, for each of said connection points, a calculated leakage resistance $R_L$ and an associated voltage representing the sum of the voltages of the first set of modules,
   the other of said lookup tables includes, for each of said connection points, a calculated leakage resistance $R_L$ and an associated voltage representing the sum of the voltages of the second set of modules.

5. A method of determining the leakage resistance $R_L$ of a connection between a first and second sets of series connected battery modules, $V_{mx}$-$V_{mn}$ and $V_{m1}$-$V_{mx}$ respectively, forming a high voltage, rechargeable battery pack, comprising:
   (A) switching said first set of modules $V_{mx}$-$V_{mn}$ into a first circuit containing a voltage measurement resistor;
   (B) switching said second set of modules $V_{m1}$-$V_{mx}$ into a second circuit containing said measurement resistor;
   (C) while said first set of modules $V_{mx}$-$V_{mn}$ is connected in said first circuit, determining the voltage $V_1$ produced by said first set of modules $V_{mx}$-$V_{mn}$, the current $I_1$ flowing through said first circuit, and the voltage $V_{a2d1}$ across said measurement resistor;
   (D) while said second set of modules $V_{m1}$-$V_{mx}$ is connected in said second circuit, simultaneously determining the voltage $V_2$ produced by said second set of modules $V_{m1}$-$V_{mx}$, the current $I_2$ flowing through said second circuit, and the voltage $V_{a2d2}$ across said measurement resistor;
   (E) compensating for any changes in the voltages of modules $V_{mx}$-$V_{mn}$, $V_{m1}$-$V_{mx}$ occurring between steps (C) and (D); and,
   (F) determining said leakage path resistance $R_L$ using the determined currents $I_1$, $I_2$, voltages $V_1$, $V_2$ and measured voltages $V_{a2d1}$ and $V_{a2d2}$.

6. The method of claim 5, wherein the voltages $V_1$ and $V_2$ are determined, using the following formulas:

$$V_1(t_{low}) = k \times V_p(t_{low})$$

$$V_2(t_{high}) = (1-k) \times V_p(t_{high})$$

where $V_P$ is the voltage of said battery pack, and
k is a calculated value relating changes in the voltage $V_p$ of said battery pack to changes in the voltage of each of said modules.

7. The method of claim 6, wherein steps (C) and (D) each include measuring the voltage $V_p$ of said battery pack.

8. The method of claim 5, wherein:
   step (C) includes simultaneously determining the voltage of each of the modules $V_{m1}$-$V_{mx}$, and
   step (D) includes simultaneously determining the voltage of each of the modules $V_{m1}$-$V_{mx}$.

9. The method of claim 5, wherein steps (C) and (D) are respectively performed at first and second points in time.

10. The method of claim 5, wherein step (E) includes preparing a pair of lookup tables providing comparative data including the leakage resistance at each of a plurality of connection points to said modules representing potential current leakage paths.

11. The method of claim 10, wherein step (E) includes determining the connection point at which the leakage resistance is the same value in each of the tables.

12. The method of claim 10, wherein:
   one of said lookup tables includes, for each of said connection points, a calculated leakage resistance $R_L$ and an associated voltage representing the sum of the voltages of modules $V_{mx}$-$V_{mn}$,
   the other of said lookup tables includes, for each of said connection points, a calculated leakage resistance $R_L$ and an associated voltage representing the sum of the voltages of modules $V_{m1}$-$V_{mx}$.

13. A method of detecting a current leakage path in a high voltage battery pack having a plurality of serially connected battery modules, comprising:
(A) connecting a first set of said modules into a first circuit containing a voltage measurement resistor;
(B) connecting a second set of said modules into a second circuit containing said measurement resistor;
(C) while said first set of modules is connected in said first circuit, simultaneously determining the voltage of each of the modules, and a first current flowing through said first circuit, and measuring a first voltage across said measurement resistor;
(D) while said second set of modules is connected in said second circuit, simultaneously determining the voltage of each of the modules, and a second current flowing through said second circuit, and measuring a second voltage across said measurement resistor;
(E) calculating the voltages $V_1(t_{low})$ and $V_2(t_{high})$ respectively across the first and second sets of modules while steps (C) and (D) are performed, according to the following formulas:

$$V_1(t_{low}) = k \times V_p(t_{low})$$

$$V_2(t_{high}) = (1-k) \times V_p(t_{high})$$

where, $V_p$ is the total battery pack voltage, and k is a calculated value relating changes in $V_p$ to changes in the voltage of each of the modules and,
(F) determining a leakage path resistance associated with said leakage path using the first and second currents, the determined voltages of the second set of modules, and the first and second measured voltages.

* * * * *